United States Patent
Hayakawa

(10) Patent No.: US 10,665,227 B2
(45) Date of Patent: May 26, 2020

(54) VOICE RECOGNITION DEVICE AND VOICE RECOGNITION METHOD

(71) Applicant: FUJITSU LIMITED, Kawasaki-shi, Kanagawa (JP)

(72) Inventor: Shoji Hayakawa, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/673,830

(22) Filed: Aug. 10, 2017

(65) Prior Publication Data

US 2018/0075843 A1 Mar. 15, 2018

(30) Foreign Application Priority Data

Sep. 15, 2016 (JP) .................................. 2016-180650

(51) Int. Cl.
*G10L 15/08* (2006.01)
*G10L 15/22* (2006.01)
*G10L 15/02* (2006.01)

(52) U.S. Cl.
CPC .............. *G10L 15/08* (2013.01); *G10L 15/02* (2013.01); *G10L 15/22* (2013.01); *G10L 2015/025* (2013.01); *G10L 2015/088* (2013.01)

(58) Field of Classification Search
CPC .................................. G10L 15/22; G10L 15/00
See application file for complete search history.

(56) References Cited

U.S. PATENT DOCUMENTS

| 6,574,595 B1* | 6/2003 | Mitchell | G10L 15/22 704/242 |
| 6,643,647 B2* | 11/2003 | Natori | G06K 9/723 704/254 |
| 2003/0110035 A1* | 6/2003 | Thong | G10L 15/083 704/254 |
| 2004/0243388 A1* | 12/2004 | Corman | G06F 17/2211 704/1 |
| 2007/0136058 A1* | 6/2007 | Jeong | G10L 15/08 704/240 |
| 2010/0312550 A1* | 12/2010 | Lee | G10L 15/063 704/10 |
| 2011/0110502 A1* | 5/2011 | Daye | H04M 3/4936 379/88.04 |
| 2013/0262116 A1* | 10/2013 | Ben-Ezra | G10L 15/04 704/254 |
| 2015/0161984 A1* | 6/2015 | VanBlon | G10L 15/063 704/244 |

(Continued)

FOREIGN PATENT DOCUMENTS

JP 2007-248529 9/2007

*Primary Examiner* — Paras D Shah
(74) *Attorney, Agent, or Firm* — Fujitsu Patent Center

(57) ABSTRACT

A voice recognition device extracts, from a first voice signal of a user, a first string of phonemes included in the first voice signal, extracts, from a second voice signal of the user, a second string of phonemes included in the second voice signal, extracts a string of common phonemes from the first string and the second string, calculates, for each of a plurality of registered keywords, a degree of similarity between a string of phonemes corresponding to the keyword and the string of common phonemes, and selects, among the plurality of keywords, a prescribed number of keywords based on the degree of similarity for each keyword.

23 Claims, 8 Drawing Sheets

(56) References Cited

U.S. PATENT DOCUMENTS

2016/0035352 A1* 2/2016 Furumoto .......... G01C 21/3608
  704/276
2017/0229120 A1* 8/2017 Engelhardt ............. G10L 15/19
2017/0329841 A1* 11/2017 Holmes ............... G06F 17/2735
2017/0364502 A1* 12/2017 Ganesalingam ...... G06F 17/276

* cited by examiner

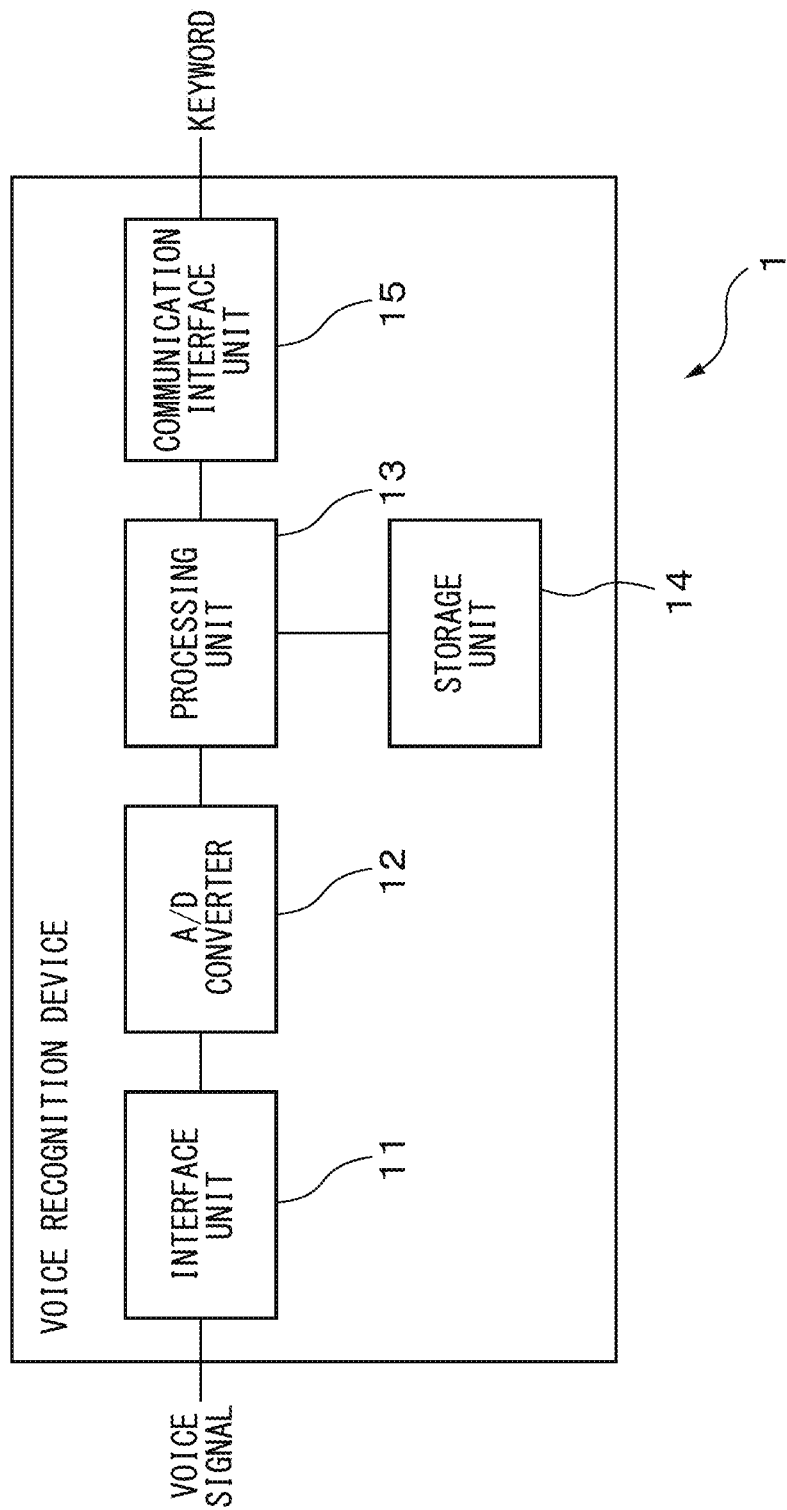

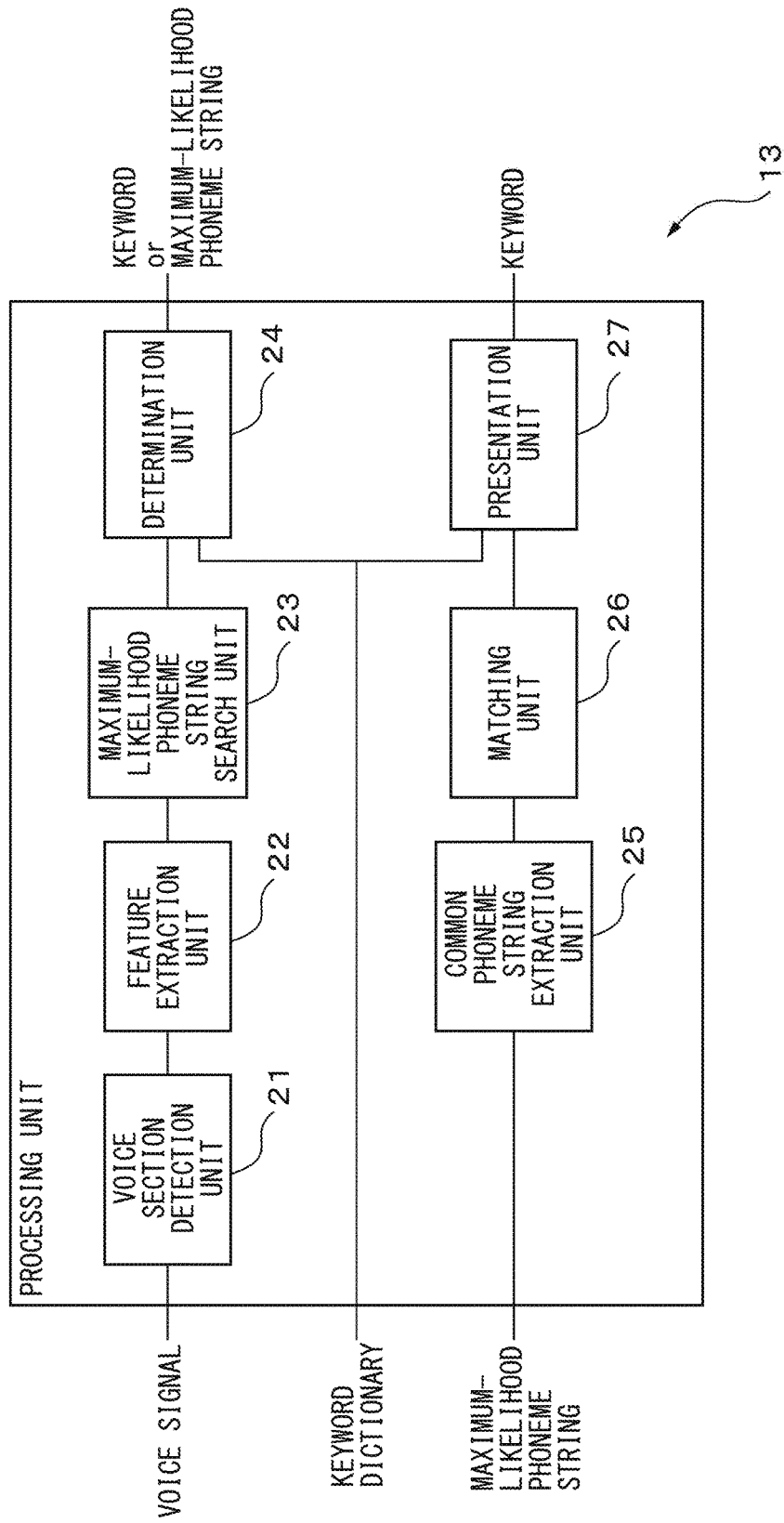

FIG. 3

| | |
|---|---|
| jitaku e kaeru (JAPANESE PRONUNCIATION, MEANING "RETURN MY HOME" IN ENGLISH) | j i t a k u e k a e r u |
| betsu ruto (JAPANESE PRONUNCIATION, MEANING "RE-ROUTE" IN ENGLISH) | b e ts u r uː t o |
| shousai (JAPANESE PRONUNCIATION, MEANING "ZOOM-IN" IN ENGLISH) | sh o u s a i |
| kouiki (JAPANESE PRONUNCIATION, MEANING "ZOOM-OUT" IN ENGLISH) | k o u i k i |
| mokutekichi (JAPANESE PRONUNCIATION, MEANING "DESTINATION" IN ENGLISH) | m o k u t e k i ch i |
| genzaichi (JAPANESE PRONUNCIATION, MEANING "CURRENT POSITION" IN ENGLISH) | g e N z a i ch i |

300

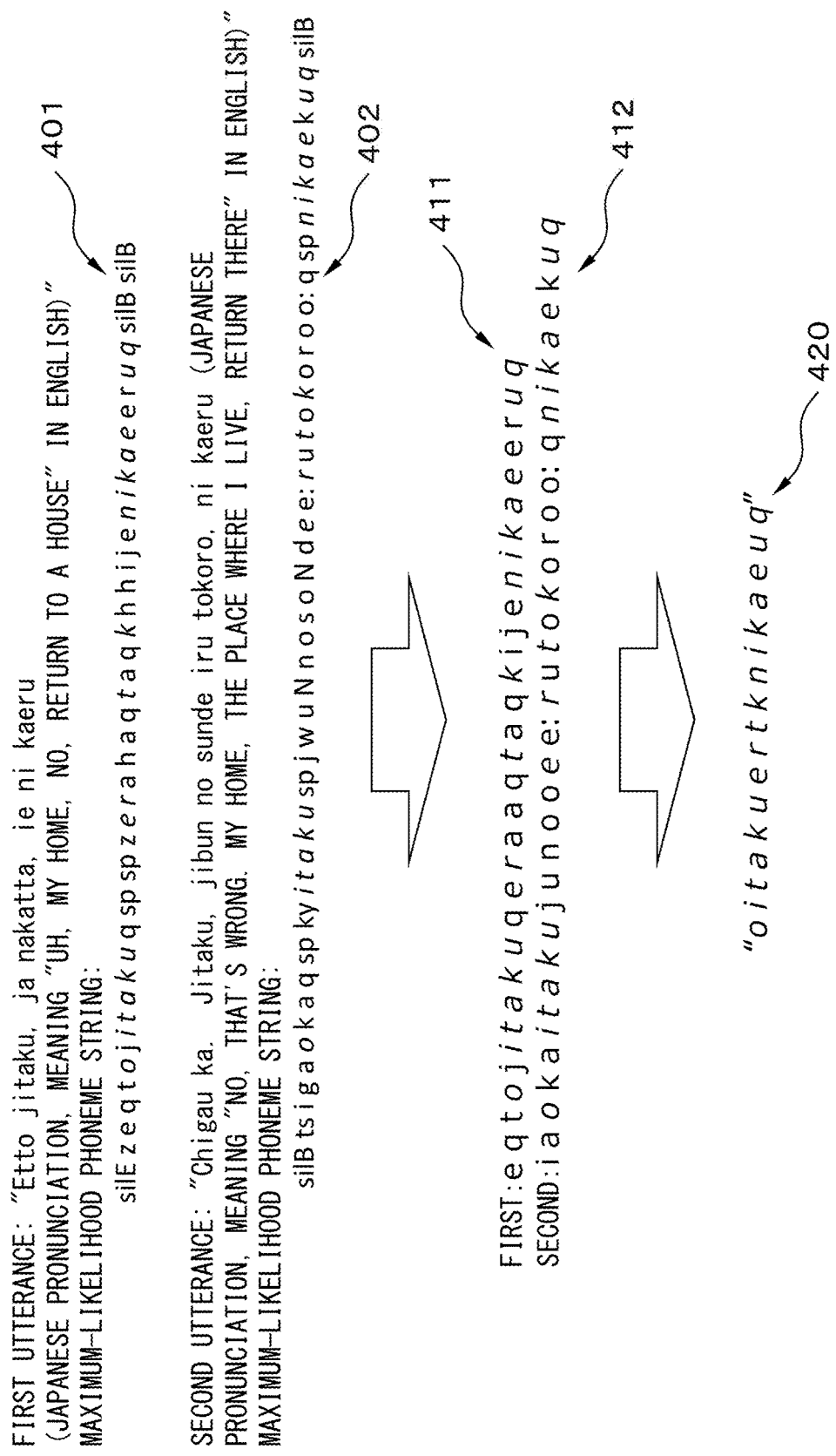

C=13, D=0, S=3 ⇒ P=81%

| SUBSTITUTUION RULE | PHONEME GROUP | REPRESENTATIVE PHONEME |
|---|---|---|
| 1 | "s","z" | "s" |
| 2 | "t","d" | "t" |
| 3 | "sh","ch","j" | "sh" |
| 4 | "p","b" | "p" |
| 5 | "k","g" | "k" |

800

VOICE RECOGNITION DEVICE AND VOICE RECOGNITION METHOD

CROSS-REFERENCE TO RELATED APPLICATION

This application is based upon and claims the benefit of priority of the prior Japanese Patent Application No. 2016-180650, filed on Sep. 15, 2016, and the entire contents of which are incorporated herein by reference.

FIELD

The embodiments discussed herein are related to a voice recognition device and a voice recognition method.

BACKGROUND

Conventionally, a voice recognition technique for recognizing words spoken by a speaker from a voice signal acquired by collecting the voice of the speaker's voice has been used in user interfaces. When using a device in which a user interface using such a voice recognition technique is employed, a user who wishes to perform a desired operation is requested to utter a keyword that has been associated with the operation in advance. Therefore, if the user does not remember the keyword for performing the operation correctly, a situation occurs in which, although the user utters an incorrect keyword repeatedly, the user interface is unable to recognize the keyword for the operation and, as a consequence, the operation is not performed.

In contrast, techniques of performing voice recognition based on a voice uttered repeatedly have been proposed (see, for example, Japanese Laid-open Patent Publication No. 2007-248529).

SUMMARY

In the technique disclosed in Japanese Laid-open Patent Publication No. 2007-248529, repeated utterance portions of a given voice signal are detected. A power spectrum into which respective power spectrums of the detected repeated utterances are integrated is generated by applying DP matching to the detected repeated utterances and, with respect to each frequency bin, selecting a power spectrum having lower power between the power spectrums of the respective voice frames matching each other in the repeated utterances. Using the integrated power spectrum, voice recognition is performed.

In the technique disclosed in Japanese Laid-open Patent Publication No. 2007-248529, for the integrated power spectrum serving as a power spectrum representing a keyword, it is presupposed that the user has uttered the correct keyword repeatedly. Therefore, when the user utters a different phrase in each utterance, the integrated power spectrum does not represent a correct keyword and, as a consequence, no keyword is recognized.

According to one embodiment, a non-transitory computer-readable recording medium having recorded thereon a computer program for voice recognition is provided. The computer program for voice recognition causes a computer to execute a process including: extracting, from a first voice signal of a user, a first string of phonemes included in the first voice signal; extracting, from a second voice signal of the user, a second string of phonemes included in the second voice signal; extracting a string of common phonemes from the first string and the second string; calculating, for each of a plurality of registered keywords, a degree of similarity between a string of phonemes corresponding to the keyword and the string of common phonemes; and selecting, among the plurality of keywords, a prescribed number of keywords based on the degree of similarity for each keyword.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a schematic configuration diagram of a voice recognition device according to one embodiment;

FIG. 2 is a functional block diagram of a processing unit included in the voice recognition device;

FIG. 3 is a diagram illustrating an example of a keyword dictionary;

FIG. 4 is a diagram illustrating an example of maximum-likelihood phoneme strings and a common phoneme string;

DESCRIPTION OF EMBODIMENTS

Figure 5:
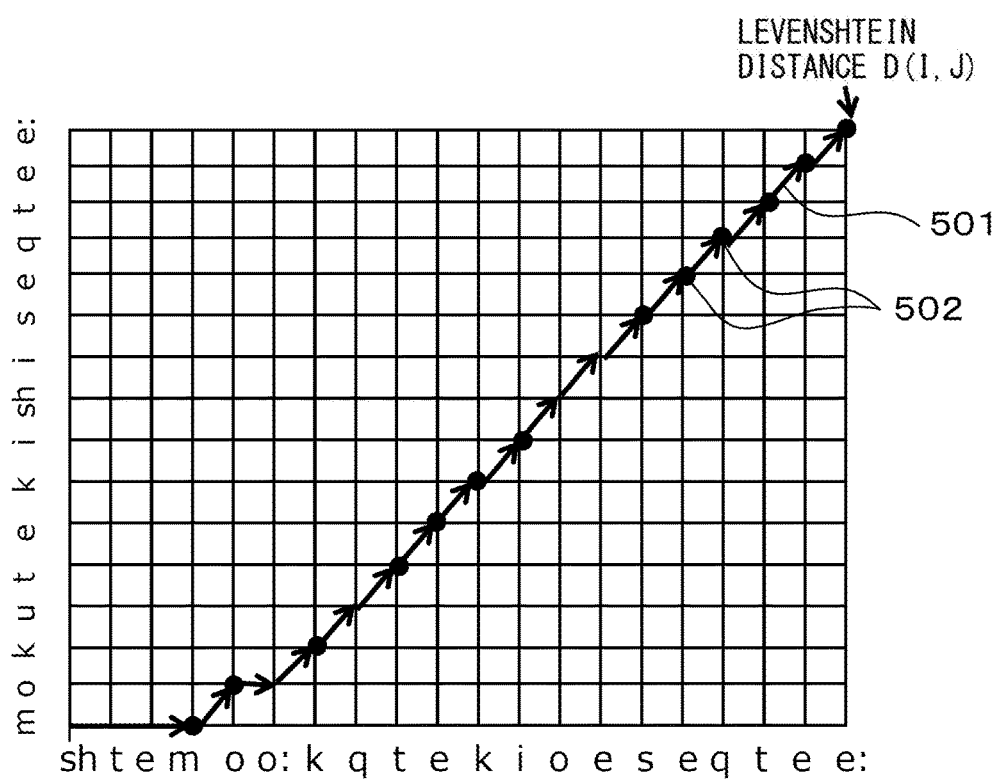
FIG. 5 is an explanatory diagram of a search procedure for an optimal path using DP matching that is used by the present embodiment.

Hereinafter, with reference to the drawings, a voice recognition device, a voice recognition method used in the voice recognition device, and a computer program for voice recognition will be described. When a user does not correctly remember a keyword needed for an operation, it is expected that the user utters a different phrase resembling the keyword each time the user speaks. For example, it is assumed that, in a navigation system in which a user interface using voice recognition is employed, "Jitaku e kaeru (Japanese pronunciation, meaning "Return my home" in English)" is set as a keyword for performing an operation of searching for a route to the home of the user. In this case, in the first utterance, it is assumed that the user, for example, uttered, "Etto jitaku, ja nakatta, ie ni kaeru (Japanese pronunciation, meaning "Uh, my home, no, return to a house" in English)". However, since the correct keyword is not included in the utterance, the operation which the user intended is not performed. Therefore, in the second utterance, it is assumed that the user, for example, uttered, "Chigau ka. Jitaku, jibun no sunde iru tokoro, ni kaeru (Japanese pronunciation, meaning "No, that's wrong. My home, the place where I live, return there" in English)". Since the correct keyword is also not included in the utterance in this case, the keyword is not recognized and the operation which the user intended is not performed. In this manner, without the intended operation being performed, the user may repeat the utterance many times.

It is also conceivable to select several keywords among the registered keywords in descending order of resemblance based on a result of voice recognition and to present the selected keywords to a user. However, since the user has also not uttered a correct keyword in this case, a keyword corresponding to an operation that the user intended to perform is not always included in keywords presented to the user.

On the other hand, it is conceivable that, when a user repeats an utterance for an operation that the user intends to perform, the user utters a phrase related to the operation every time the user speaks. It is thus expected that, in each utterance, at least a portion of a keyword corresponding to the operation is included.

Therefore, the voice recognition device extracts a common phoneme string from voices that are uttered repeatedly by the user, exemplifying a speaker, and compares the extracted phoneme string with the phoneme strings of the respective keywords registered in a keyword dictionary to select the most resembling keyword. The voice recognition device presents the selected keyword to the user. The keyword may be an individual word or a phrase including a plurality of words.

The voice recognition device, a voice recognition method used in the voice recognition device, and a computer program for voice recognition may be implemented in various devices employing a user interface using voice recognition, such as a navigation system, a mobile phone, and a computer.

FIG. 1 is a schematic configuration diagram of a voice recognition device according to one embodiment. A voice recognition device 1 includes an interface unit 11, an analog/digital converter 12, a processing unit 13, a storage unit 14, and a communication interface unit 15.

The interface unit 11 is an example of a voice input unit and includes an audio interface. The interface unit 11 acquires from, for example, a microphone (not illustrated), a monaural voice signal that is an analog signal and represents a voice that a user uttered. The interface unit 11 outputs the voice signal to the analog/digital converter 12 (hereinafter, referred to as A/D converter). By sampling the analog voice signal at a prescribed sampling rate, the A/D converter 12 digitizes the voice signal. The A/D converter 12 outputs the digitized voice signal to the processing unit 13. In the following description, a digitized voice signal is simply referred to as a voice signal.

The processing unit 13 includes, for example, one or a plurality of processors, a memory circuit, and a peripheral circuit. By performing voice recognition processing, the processing unit 13 selects one of the keywords registered in a keyword dictionary on the basis of the voice signal and outputs information representing the selected keyword via the communication interface unit 15. Alternatively, the processing unit 13 may display the selected keyword via a display device (not illustrated). Details of the voice recognition process performed by the processing unit 13 will be described later.

The storage unit 14 includes, for example, a readable/writable nonvolatile semiconductor memory and a readable/writable volatile semiconductor memory. Furthermore, the storage unit 14 may include a magnetic recording medium or an optical recording medium and an access device therefor. The storage unit 14 stores various types of data that are used in the voice recognition process performed by the processing unit 13 and various types of data that are generated during the voice recognition process. For example, the storage unit 14 stores various types of information that are used for estimating, from a voice signal, a maximum-likelihood phoneme string with respect to the voice signal and the maximum-likelihood phoneme string and common phoneme string acquired from the voice signal. The maximum-likelihood phoneme string and the common phoneme string will be described later. Moreover, the storage unit 14 stores the keyword dictionary that contains the phoneme strings corresponding to the respective keywords to be recognized by the voice recognition device 1.

The communication interface unit 15 includes a communication interface circuit for connecting the voice recognition device 1 to another device, for example, a navigation system. The communication interface unit 15 outputs information that is received from the processing unit 13 and represents a selected keyword to the another device. In the case where the voice recognition device 1 itself is implemented as a portion of the other device, the communication interface unit 15 may be omitted.

Hereinafter, details of the processing unit 13 will be described.

FIG. 2 is a functional block diagram of the processing unit 13. The processing unit 13 includes a voice section detection unit 21, a feature extraction unit 22, a maximum-likelihood phoneme string search unit 23, a determination unit 24, a common phoneme string extraction unit 25, a matching unit 26, and a presentation unit 27. The respective units that the processing unit 13 includes are, for example, functional modules achieved by a computer program running on a processor that the processing unit 13 includes. Alternatively, the respective units that the processing unit 13 includes may be one or a plurality of integrated circuits that achieve the functions of the respective units.

The voice section detection unit 21 divides a voice signal into frames with a prescribed length. The frame length is set at, for example, several tens to 100 msec. By detecting frames in which the user is uttering a voice among the respective frames of the voice signal, the voice section detection unit 21 detects a voice section that is a section in which a user is speaking.

In general, the power of a voice signal in a frame in which a user is uttering a voice is higher than the power of a voice signal in a frame in which the user is not uttering a voice. Thus, the voice section detection unit 21, for example, transforms a voice signal in the time domain to a spectral signal in the frequency domain using a time-frequency transform with respect to each frame. The voice section detection unit 21 may use, for example, a Fast Fourier Transform (FFT) as the time-frequency transform. The voice section detection unit 21 calculates the power of each frequency band by squaring a spectral signal of the frequency band, calculates the total sum of the power over all the frequency bands, and calculates a logarithmic value of the total sum (hereinafter, referred to as log power). The voice section detection unit 21 detects a frame the log power of which is higher than a prescribed power threshold value as a frame in which the user is uttering a voice. The power threshold value is set at, for example, a value computed by adding a prescribed offset to the log power of a background noise. The log power of a background noise may be, for example, set in advance or be updated with respect to each frame. For example, the voice section detection unit 21 updates the log power of a background noise by adding a value calculated by multiplying the log power of a frame which is not higher than the power threshold value by a forgetting factor α (for example, α=0.01) to a value calculated by multiplying the log power of the background noise at the time by (1−α).

The voice section detection unit 21 may, with respect to each frame, determine whether or not the frame is a frame in which the user is uttering a voice in accordance with another method for detecting a voice utterance section.

The voice section detection unit 21 detects a section including consecutive frames, which are determined that the user is uttering a voice, as a voice section with respect to a voice signal. Every time a voice section is detected, the voice section detection unit 21 notifies the feature extraction unit 22 of the start time and the end time of the voice section.

The feature extraction unit 22 calculates a plurality of feature amounts that represent features of the voice of the user with respect to each frame in a voice section. The feature extraction unit 22 generates a feature vector that has the respective feature amounts as elements thereof and outputs the feature vector with respect to each frame.

For example, the feature extraction unit 22 calculates Mel frequency cepstral coefficients (MFCC) and their Δ cepstrums and ΔΔ cepstrums as feature amounts that represent features of the voice of the user.

The feature extraction unit 22, for example, performs an FFT to calculate frequency coefficients with respect to each frame. The feature extraction unit 22 obtains, as power values, outputs from passing a power spectrum calculated from the respective frequency coefficients through a filter bank in which filters are arranged in such a way that center frequencies thereof are equally spaced in Mel-scale. Subsequently, the feature extraction unit 22 calculates MFCCs by performing a frequency transform such as a discrete cosine transform (DCT) on the logarithmic values of the power values and taking out coefficients having orders not higher than a prescribed order among the obtained DCT coefficients.

The feature extraction unit 22 calculates cepstrums with respect to each frame and, using the cepstrums, calculates Δ cepstrums. The Δ cepstrums are calculated by the following equation.

$$\Delta C_n(t) = \frac{\sum_{k=-K}^{K} k h_k C_n(t+k)}{\sum_{k=-K}^{K} k^2 h_k} \quad (1)$$

In the equation, $C_n(t)$ and $\Delta C_n(t)$ denote an n-th cepstrum coefficient and an n-th Δ cepstrum coefficient, respectively, of frame t. In addition, $h_k$ is a symmetric window function with a time width of (2K+1). With regard to the window function, $h_k=1$ may hold. Furthermore, by substituting $C_n(t)$ in the equation (1) with $\Delta C_n(t)$, the feature extraction unit 22 may calculate an n-th ΔΔ cepstrum coefficient.

The feature extraction unit 22 may set coefficients having prescribed orders (for example, 1st to 12th) as feature amounts with respect to each of the MFCC, the Δ cepstrum, and the ΔΔ cepstrum.

According to a variation, the feature extraction unit 22 may also calculate, as feature amounts, an integrated value of power, a pitch frequency, and the like in conjunction with coefficients having prescribed orders with respect to the MFCC, the Δ cepstrum, and the ΔΔ cepstrum or in place of the coefficients having prescribed orders.

The feature extraction unit 22 outputs the feature vectors of the respective frames to the maximum-likelihood phoneme string search unit 23.

The maximum-likelihood phoneme string search unit 23 is an example of a phoneme string extraction unit and searches for a maximum-likelihood phoneme string with respect to a voice section on the basis of the feature amounts extracted from the respective frames in the voice section. The maximum-likelihood phoneme string is a phoneme string in which respective phonemes included in a voice are arranged in a sequence of utterances thereof and that are estimated to be most probable.

For this purpose, the maximum-likelihood phoneme string search unit 23 uses, for example, a GMM-HMM in which a hidden Markov model (HMM) is used as an acoustic model to calculate output probabilities of respective phonemes for feature vectors of a voice using a Gaussian mixture model (GMM).

Specifically, with respect to each frame in the voice section, by inputting the feature vector of the frame to the GMM, the maximum-likelihood phoneme string search unit 23 calculates output probabilities of the respective HMM states corresponding to the respective phonemes for the frame. In addition, before inputting a feature vector into the GMM, the maximum-likelihood phoneme string search unit 23 may, for the feature vector calculated from each frame, perform normalization, referred to as cepstral mean normalization (CMN), in which, with respect to each dimension of the feature vector, a mean value is estimated and the estimated mean value is subtracted from a value at the dimension.

By using the calculated output probabilities as output probabilities relating to corresponding states of the phoneme HMM with respect to each frame, the maximum-likelihood phoneme string search unit 23 calculates a phoneme string that maximizes a cumulative log likelihood as a maximum-likelihood phoneme string for the voice section of interest.

For example, the maximum-likelihood phoneme string search unit 23 calculates logarithmic values of probabilities (state transition probabilities) of transitions from the HMM states of phoneme candidates, which are transition sources, for the previous frame to the HMM state of one phoneme candidate, which is a transition destination, for the current frame and a logarithmic value of an output probability of the HMM state of the one phoneme candidate for the current frame. By adding the calculated logarithmic values to a cumulative log likelihood that was calculated for the HMM states of respective phoneme candidates for all previous frames, the maximum-likelihood phoneme string search unit 23 calculates a cumulative log likelihood for the HMM state of the one phoneme candidate for the current frame. The maximum-likelihood phoneme string search unit 23 selects, among the HMM states of phoneme candidates at transition sources, a phoneme candidate at a transition source that produces a largest cumulative log likelihood when a transition from the transition source to the HMM state of the one phoneme candidate, which is a transition destination, for the current frame takes place. The maximum-likelihood phoneme string search unit 23 continues, to the last frame in the voice section, Viterbi calculation in which the selection is performed with respect to the HMM states of all the phoneme candidates for the current frame. The maximum-likelihood phoneme string search unit 23 may select a state transition that causes the above-described cumulative value to be not smaller than a prescribed value. Subsequently, the maximum-likelihood phoneme string search unit 23 selects a state that maximizes the cumulative log likelihood for the last frame, computes a history of state transitions until reaching the selected state (Viterbi path) by backtracking, and obtains a maximum-likelihood phoneme string in the voice section based on the Viterbi path.

The maximum-likelihood phoneme string search unit 23 may search for a maximum-likelihood phoneme string relating to a voice section using any of various other techniques for searching for a maximum-likelihood phoneme string from a voice signal.

The maximum-likelihood phoneme string search unit 23 outputs the obtained maximum-likelihood phoneme string to the determination unit 24.

By comparing the maximum-likelihood phoneme string of the voice section with the phoneme strings representing the utterances of the keywords registered in the keyword dictionary, the determination unit 24 determines whether or not the user uttered any keyword in the voice section.

FIG. 3 is a diagram illustrating an example of a keyword dictionary. In keyword dictionary 300, with respect to each keyword, a character string representing a written form of the keyword and a phoneme string representing a pronunciation of the keyword are registered. For example, for a keyword "Jitaku e kaeru (Japanese pronunciation, meaning "Return my home" in English)", a phoneme string "jitakue-kaeru" of the keyword is registered.

For example, with respect to each keyword registered in the keyword dictionary, the determination unit 24 calculates a degree of similarity P between the phoneme string of the keyword and a maximum-likelihood phoneme string in accordance with, for example, the following equation.

$$P = \frac{C}{C+D+S} \times 100(\%) \qquad (2)$$

In the equation, C is the number of coincident phonemes between the maximum-likelihood phoneme string and the phoneme string of the keyword of interest and D is the number of phonemes that are included in the phoneme string of the keyword of interest but not included in the maximum-likelihood phoneme string. In addition, S is the number of phonemes that are included in the phoneme string of the keyword of interest and are different from phonemes at corresponding positions in the maximum-likelihood phoneme string.

The determination unit 24 compares a maximum value among the degrees of similarity of the respective keywords with a coincidence determination threshold value. When the maximum value is larger than the coincidence determination threshold value, the determination unit 24 determines that a keyword corresponding to the maximum value was uttered by the user in the voice section. The processing unit 13 outputs information representing the keyword, which is determined to have been uttered by the user, to a device connected to the voice recognition device 1 via, for example, a communication interface (not illustrated). Alternatively, the processing unit 13 may perform processing corresponding to the keyword, which is determined to have been uttered by the user. The processing unit 13 may delete the maximum-likelihood phoneme string, which has been saved in the storage unit 14. The processing unit 13 finishes the voice recognition process for the voice section.

On the other hand, when the maximum value among the degrees of similarity is not larger than the coincidence determination threshold value, the determination unit 24 saves the maximum-likelihood phoneme string in the storage unit 14.

The determination unit 24 may determine whether or not any keyword registered in the keyword dictionary was uttered using any of other techniques for recognizing a specific keyword by voice recognition. Even in this case, when determining that no keyword registered in the keyword dictionary was uttered, the determination unit 24 saves the maximum-likelihood phoneme string in the storage unit 14.

When two or more maximum-likelihood phoneme strings have been saved in the storage unit 14, i.e., the user has uttered keywords repeatedly while no keyword has been recognized, the common phoneme string extraction unit 25 extracts a string in which common phonemes to the maximum-likelihood phoneme strings are arranged in a sequence of utterances (hereinafter, simply referred to as common phoneme string).

In the present embodiment, the common phoneme string extraction unit 25 preferably deletes a phoneme representing silence from each of the two maximum-likelihood phoneme strings. This is because a phoneme representing silence does not have any relation with a keyword to be recognized. For example, when silence immediately before a word is represented by a phoneme "silB", silence immediately after a word is represented by a phoneme "silE", and a short pause is represented by a phoneme "sp", the phonemes "silB", "silE", and "sp" are deleted from the maximum-likelihood phoneme strings. In addition, the common phoneme string extraction unit 25 preferably deletes a phoneme that appears in only either one of the two maximum-likelihood phoneme strings from the respective maximum-likelihood phoneme strings. This is because a phoneme that appears in only either one of the two maximum-likelihood phoneme strings never becomes common to the maximum-likelihood phoneme strings.

After a phoneme(s) representing silence and/or a phoneme(s) that appear(s) in only either one of the maximum-likelihood phoneme strings has/have been deleted from the respective maximum-likelihood phoneme strings, the common phoneme string extraction unit 25 extracts coincident phonemes between the two maximum-likelihood phoneme strings in order from the heads of the two maximum-likelihood phoneme strings. The common phoneme string extraction unit 25 sets a string in which the extracted phonemes are arranged from the head as a common phoneme string.

FIG. 4 is a diagram illustrating an example of maximum-likelihood phoneme strings and a common phoneme string. Illustrated as FIG. 4, it is assumed that, in the first utterance, a user uttered, "Etto jitaku, ja nakatta, ie ni kaeru (Japanese pronunciation, meaning "Uh, my home, no, return to a house" in English)". For the utterance, a maximum-likelihood phoneme string 401 is calculated. In the second utterance, it is assumed that, the user uttered, "Chigau ka. Jitaku, jibun no sunde iru tokoro, ni kaeru (Japanese pronunciation, meaning "No, that's wrong. My home, the place where I live, return there" in English)". For the utterance, a maximum-likelihood phoneme string 402 is calculated. In the maximum-likelihood phoneme strings 401 and 402, each of the phonemes "sp", "silB", and "silE" is a phoneme representing silence.

As described above, deleting phonemes representing silence and phonemes that appear in only either one of the maximum-likelihood phoneme strings from each of the maximum-likelihood phoneme strings 401 and 402 causes amended maximum-likelihood phoneme strings 411 and 412 to be obtained. Extracting common phonemes from the amended maximum-likelihood phoneme strings 411 and 412 in order from the head causes a common phoneme string ("oitakuertknikaeuq") 420 to be obtained.

The common phoneme string extraction unit 25 saves the extracted common phoneme string in the storage unit 14.

The matching unit 26 calculates degrees of similarity between the common phoneme string and the phoneme strings of the respective keywords registered in the keyword dictionary and identifies a keyword having a phoneme string most resembling the common phoneme string among the respective keywords.

Since the common phoneme string is extracted when the user did not utter any keyword registered in the keyword dictionary, the common phoneme string may not coincide with the phoneme string of any keyword registered in the keyword dictionary completely. However, since the user uttered a voice corresponding to an intended operation, the user is considered to have uttered a phrase resembling a keyword corresponding to the operation. In particular, a portion common to voices that the user uttered repeatedly may include a portion of the keyword corresponding to the intended operation. Therefore, in the present embodiment, the matching unit 26 matches the common phoneme string against the phoneme strings of the respective keywords registered in the keyword dictionary in accordance with a dynamic programming algorithm to calculate a degree of similarity for the common phoneme string with respect to each keyword. On the basis of the degrees of similarity to the respective keywords, the matching unit 26 identifies a keyword having a phoneme string most resembling the common phoneme string. In the following description, the matching in accordance with a dynamic programming algorithm is referred to as DP matching.

For example, with respect to each keyword registered in the keyword dictionary, the matching unit 26 calculates a Levenshtein distance (also referred to as edit distance) between the phoneme string corresponding to the keyword and the common phoneme string. In so doing, the matching unit 26 calculates a shortest path that minimizes a cumulative distance using the DP matching.

FIG. 5 is an explanatory diagram of a search procedure for an optimal path by use of the DP matching used by the present embodiment. In FIG. 5, the respective phonemes included in the common phoneme string are indicated at respective grid points on the horizontal axis in order from the left. On the vertical axis, the respective phonemes included in the phoneme string of a keyword of interest are indicated at respective grid points in order from the bottom.

The matching unit 26 searches paths directed from the grid point at the bottom left end toward the grid point at the top right end for an optimal path. In other words, the matching unit 26 searches for a path that minimizes the Levenshtein distance. In this case, the grid point at the bottom left end becomes the first target grid point. The matching unit 26 sets one of the grid points adjacent to the right side, the upper side, and the upper right side of the current target grid point as a next target grid point. For example, when a transition from the current target grid point to the grid point adjacent to the upper right side of the current target grid point takes place, the matching unit 26 determines whether or not a phoneme corresponding to a row to which the next target grid point belongs in the keyword and a phoneme corresponding to a column to which the next target grid point belongs in the common phoneme string coincide with each other. When they coincide, a point added to the edit distance is '0'. However, when they do not coincide, the point added to the edit distance is '+1'. Both of the phonemes that do not coincide with each other correspond that the phoneme corresponding to the next target grid point in the common phoneme string is substituted in the phoneme string of the keyword of interest.

When the grid point adjacent to the upper side of the current target grid point becomes the next target grid point, the point added to the edit distance is '+1'. The transition to the upper side corresponds to insertion of a phoneme into the phoneme string corresponding to the keyword of interest. Furthermore, when the grid point adjacent to the right side of the current target grid point becomes the next target grid point, the point added to the edit distance is also '+1'. The transition to the right side corresponds to a lack of a phoneme in the phoneme string corresponding to the keyword of interest.

In the example illustrated in FIG. 5, a path 501 indicated by arrows is a shortest path, and respective dots 502 indicate coincident phonemes between the common phoneme string and the phoneme string corresponding to the keyword of interest in the shortest path. Therefore, in the example, the Levenshtein distance D(I,J) is "7".

With respect to each of the keywords registered in the keyword dictionary, the matching unit 26 calculates a degree of similarity between the phoneme string of the keyword and the common phoneme string using a result of the DP matching. For example, the matching unit 26 calculates a degree of similarity P in accordance with the following equation.

$$P = \alpha - \frac{D(I, J)}{I + J} \quad (3)$$

In the equation, D(I,J) denotes the Levenshtein distance between the phoneme string of a keyword of interest and the common phoneme string. In addition, I and J respectively denote the number of phonemes included in the phoneme string of a keyword of interest and the number of phonemes included in the common phoneme string. Further, α is a preset constant and is, for example, 1. As is evident from the equation (3), the smaller the Levenshtein distance and the larger the number of phonemes included in the phoneme string of a keyword of interest and the number of phonemes included in the common phoneme string, the larger the degree of similarity P becomes.

Alternatively, the matching unit 26 may calculate the degree of similarity P based on a degree of coincidence between the phoneme string of the keyword of interest and the common phoneme string in accordance with the equation (2). In this case, C is the number of coincident phonemes between the common phoneme string and the phoneme string of the keyword of interest and D is the number of phonemes that are included in the phoneme string of the keyword of interest but not included in the common phoneme string. In addition, S is the number of phonemes that are included in the phoneme string of the keyword of interest and are different from the phonemes at corresponding positions in the common phoneme string.

Figure 6:
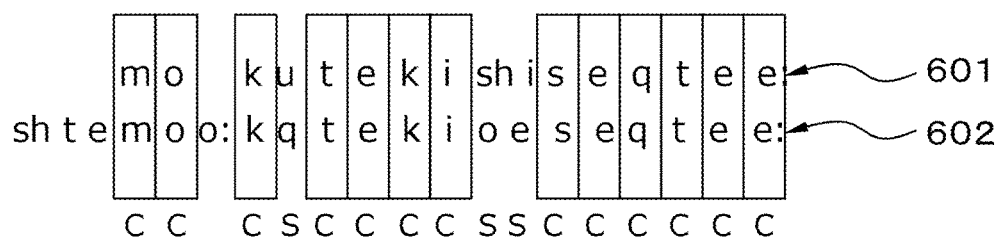
FIG. 6 is a diagram illustrating an example of the calculation of a degree of similarity according to a variation.

FIG. 6 is a diagram illustrating an example of calculation of a degree of similarity according to the variation. Coincident phonemes between a phoneme string 601 of a keyword of interest, which is illustrated on the upper side, and a common phoneme string 602, which is illustrated on the lower side, are enclosed by rectangles. In the example, since C=13, D=0, and S=3 hold, the degree of similarity P becomes approximately 81%.

In the example, the number of phonemes that are included in the common phoneme string but not included in the phoneme string of the keyword of interest is not taken into consideration in the calculation of the degree of similarity P. This is because the user originally did not utter a keyword registered in the keyword dictionary, and it is thus supposed that, for any keyword registered in the keyword dictionary, a phoneme that is not included in the phoneme string of the keyword may be included in the common phoneme string.

The matching unit 26 identifies a keyword that maximizes the degree of similarity. The matching unit 26 notifies the presentation unit 27 of the identified keyword. When the maximum value among the degrees of similarity is not higher than a prescribed threshold value, the matching unit 26 may determine that the keyword that the user intended is unable to be detected from the common phoneme string and does not have to notify the presentation unit 27 of a keyword that maximizes the degree of similarity. In this case, the processing unit 13 may delete the respective maximum-likelihood phoneme strings (or the older maximum-likelihood phoneme string) that have been saved in the storage unit 14 and the common phoneme string. The processing unit 13 may repeat a search for a maximum-likelihood phoneme string, extraction of a common phoneme string, and calculation of degrees of similarity between the phoneme strings of keywords and the common phoneme string every time a voice is uttered until the maximum value among the degrees of similarity exceeds the prescribed threshold value.

The presentation unit 27 presents the identified keyword to the user. For example, the presentation unit 27 makes a display device (not illustrated) connected to the voice recognition device 1 display the keyword. Alternatively, when the identified keyword is associated with some operation, the presentation unit 27 may make the display device display a phrase expressing details of the operation. For example, when the identified keyword is "Return my home", the presentation unit 27 displays a phrase "May the system set a route home?" In order to determine such a phrase, the presentation unit 27 may refer to a table in which a keyword, details of an operation, and a phrase to be displayed are associated with one another with respect to each keyword to determine details of an operation and a phrase to be displayed corresponding to the identified keyword. Such a table is saved in the storage unit 14 in advance.

Alternatively, on the basis of a character string representing the identified keyword or a character string representing details of an operation associated with the keyword, the presentation unit 27 may also generate a synthesized voice signal corresponding to the keyword. The presentation unit 27 may play back the synthesized voice signal via a speaker connected to the voice recognition device 1. In so doing, the presentation unit 27 may use any technology among various voice synthesis technologies of generating a synthesized voice signal from a character string. The configuration as described above enables the presentation unit 27 to present a keyword to the user even when the user is unable to confirm a display device visually in such a case in which the voice recognition device 1 is implemented in a navigation system.

By confirming a presented keyword and performing a prescribed input operation by the user, a device connected to the voice recognition device 1 or a device in which the voice recognition device 1 is implemented may execute an operation corresponding to the keyword. Alternatively, the user may utter a voice indicating approval or disapproval. By recognizing the voice, the voice recognition device 1 may determine approval or disapproval. When the voice recognition device 1 determines that the user has uttered a voice indicating approval, the device connected to the voice recognition device 1 or the device in which the voice recognition device 1 is implemented may execute an operation corresponding to the keyword.

Figure 7:
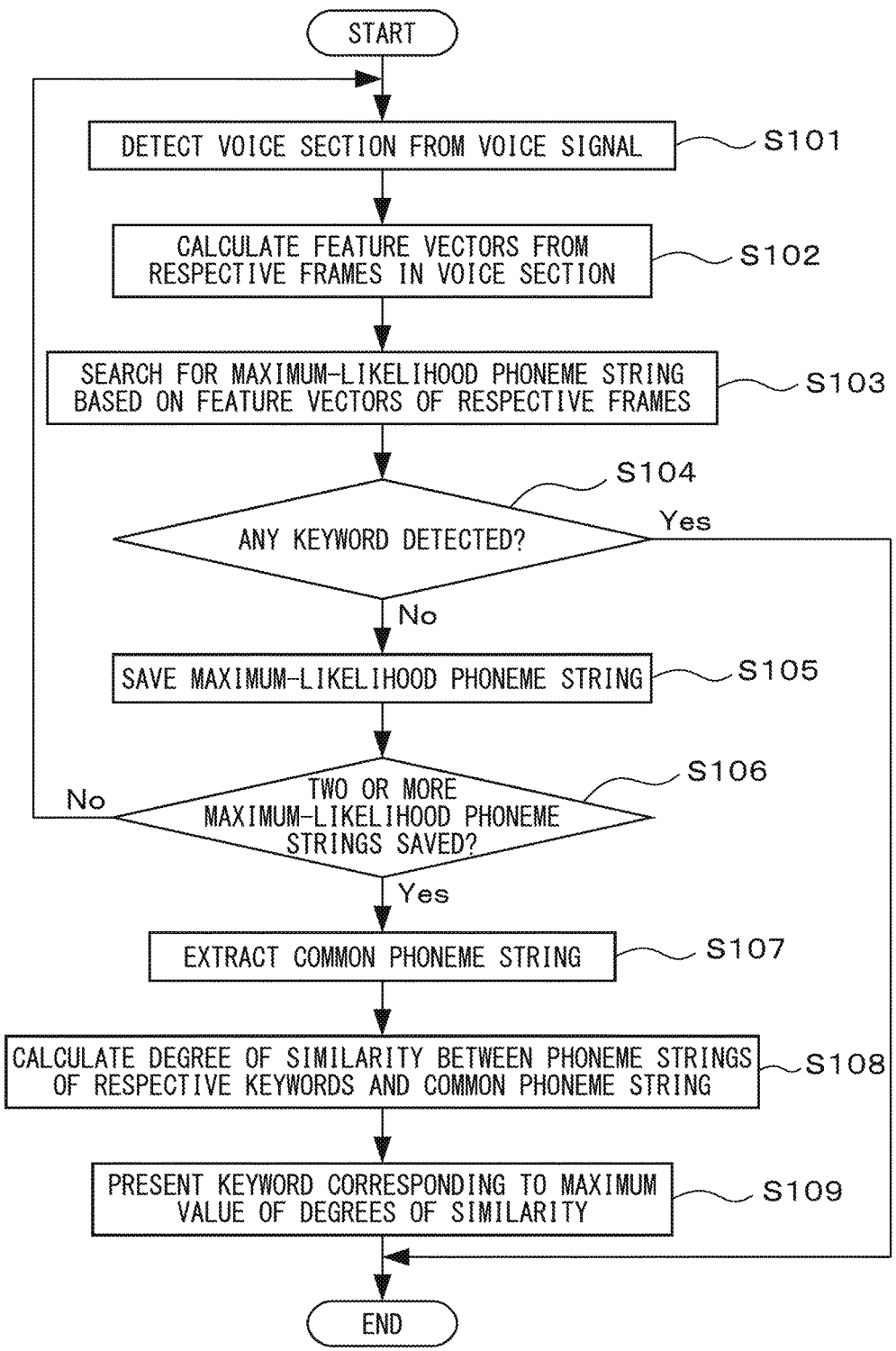
FIG. 7 is an operation flowchart of voice recognition process.

FIG. 7 is an operation flowchart of the voice recognition process according to the present embodiment. The processing unit 13 performs the voice recognition process in accordance with the operation flowchart described below.

The voice section detection unit 21 detects a voice section from an input voice signal (step S101). With respect to each frame in the voice section, the feature extraction unit 22 calculates a feature vector that includes a plurality of feature amounts representing characteristics of the voice of a user (step S102).

On the basis of the feature vectors of the respective frames, the maximum-likelihood phoneme string search unit 23 searches for a maximum-likelihood phoneme string corresponding to a voice uttered in the voice section (step S103). On the basis of the maximum-likelihood phoneme string and a keyword dictionary, the determination unit 24 determines whether or not any keyword registered in the keyword dictionary is detected in the voice section (step S104). When any keyword is detected (Yes in step S104), the processing unit 13 outputs information representing the keyword and finishes the voice recognition process.

On the other hand, when having determined that the voice of the user in the voice section does not coincide with any keyword registered in the keyword dictionary (No in step S104), the determination unit 24 saves the maximum-likelihood phoneme string in the storage unit 14 (step S105).

Subsequently, the processing unit 13 determines whether or not two or more maximum-likelihood phoneme strings are saved in the storage unit 14 (step S106). When the number of saved maximum-likelihood phoneme strings is one (No in step S106), the process unit 13 repeats the processing in and after step S101 for a newly input voice signal.

On the other hand, when the number of saved maximum-likelihood phoneme strings is two or more (Yes in step S106), the common phoneme string extraction unit 25 extracts a common phoneme string from the respective maximum-likelihood phoneme strings (step S107). The matching unit 26 calculates degrees of similarity between phoneme strings of the respective keywords registered in the keyword dictionary and the common phoneme string in accordance with the DP matching (step S108). The matching unit 26 presents a keyword corresponding to a maximum value among the degrees of similarity to the user (step S109). The processing unit 13 finishes the voice recognition process.

As described thus far, when no keyword is recognized among the keywords registered in the keyword dictionary from the voice that the user uttered, the voice recognition device extracts a common phoneme string that appears in common between maximum-likelihood phoneme strings of a plurality of voice sections that have been uttered repeatedly. The voice recognition device calculates degrees of similarity between the common phoneme string and the phoneme strings of the respective keywords registered in the keyword dictionary in accordance with the DP matching, identifies a keyword corresponding to a maximum value among the degrees of similarity, and presents the identified keyword to the user. Thus, even when the user does not correctly utter a keyword registered in the keyword dictionary and utters a different phrase each time, the voice recognition device may identify a keyword that the user intended to make the voice recognition device recognize. Therefore, even when the user does not remember a keyword correctly, the voice recognition device may prevent the user from uttering repeatedly to try to utter the keyword.

According to a variation, information indicating groups of phonemes that may be substituted with one another when uttered may be saved in the storage unit 14 in advance. The common phoneme string extraction unit 25 may substitute a phoneme included in a phoneme group with a representative phoneme of the phoneme group in each maximum-likelihood phoneme string and thereafter extract a common phoneme string. Performing the operation enables the common phoneme string extraction unit 25 to extract a more appropriate common phoneme string.

Figures 8, 9:
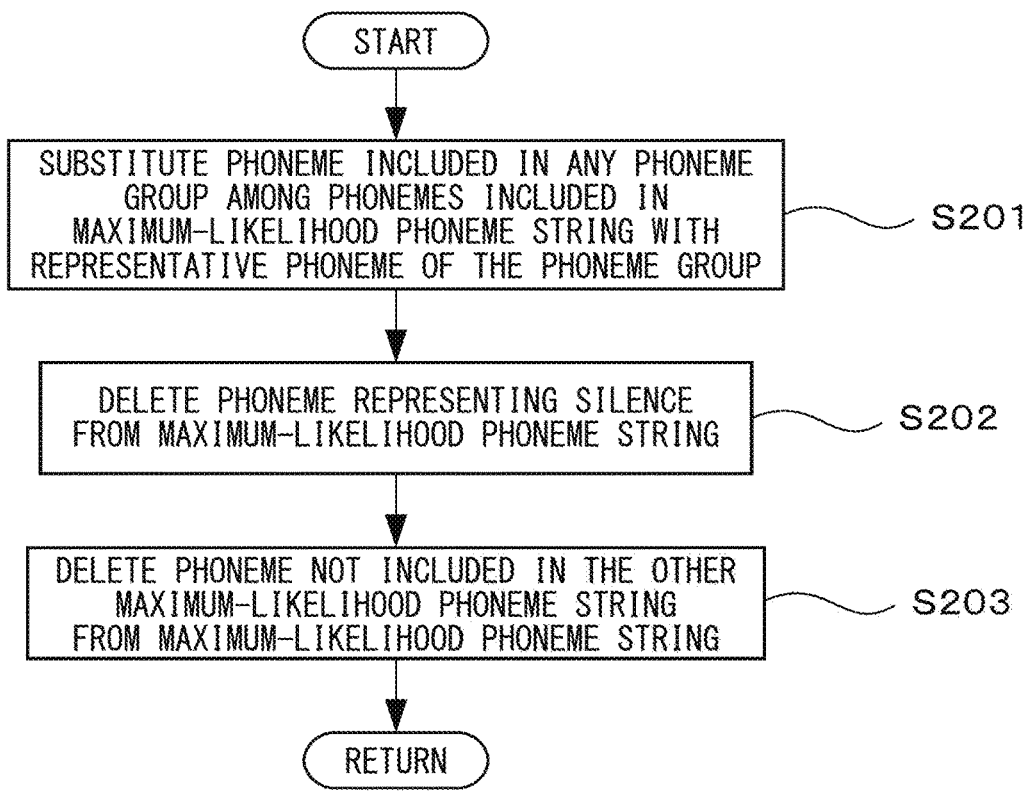
FIG. 8 is a diagram illustrating an example of a table representing the relationships between phoneme groups and representative phonemes.
FIG. 9 is a flowchart relating to the correction of a maximum-likelihood phoneme string according to a variation.

FIG. 8 is a diagram illustrating an example of a table expressing relationships between phoneme groups and representative phonemes. In this example, with respect to each row in a table 800, one phoneme group is indicated. In the example, phonemes having similar articulation patterns are grouped with one another. For example, a phoneme "s" and a phoneme "z" are included in the first phoneme group, and the phonemes included in the phoneme group are substituted with a representative phoneme "s". In the second phoneme group, a phoneme "t" and a phoneme "d" are included, and the phonemes included in the phoneme group are substituted with a representative phoneme "t".

The phoneme groups may be obtained by grouping phonemes with one another that are likely to be mistaken for one another on the basis of a confusion matrix relating to phoneme substitution errors that is acquired through a voice recognition experiment. A representative phoneme with respect to each phoneme group may be set to any phoneme included in the phoneme group.

FIG. 9 is a flowchart relating to correction of a maximum-likelihood phoneme string according to the variation. After performing correction with respect to each maximum-likelihood phoneme string in accordance with the flowchart, the common phoneme string extraction unit 25 may extract a common phoneme string.

The common phoneme string extraction unit 25 substitutes a phoneme included in any of phoneme groups among phonemes included in a maximum-likelihood phoneme string of interest with a representative phoneme of the phoneme group (step S201). The common phoneme string extraction unit 25 deletes a phoneme representing silence from the maximum-likelihood phoneme string (step S202). Subsequently, the common phoneme string extraction unit 25 deletes a phoneme that is included in the maximum-likelihood phoneme string but not included in the other maximum-likelihood phoneme string that is referenced in extracting a common phoneme string (step S203). The common phoneme string extraction unit 25 finishes the correction of the maximum-likelihood phoneme string.

The common phoneme string extraction unit 25 may change the execution sequence of the processing in step S201 and the processing in step S202.

Similarly, the matching unit 26 may also calculate a degree of similarity to the common phoneme string after substituting a phoneme included in a phoneme group with a representative phoneme of the phoneme group with respect to the phoneme string of each keyword registered in the keyword dictionary. Executing the operation enables the matching unit 26 to calculate degrees of similarity between the phoneme strings of the respective keywords and the common phoneme string more accurately.

Furthermore, according to another variation, the common phoneme string extraction unit 25 may extract a common phoneme string from three or more maximum-likelihood phoneme strings. In this case, when acquiring two maximum-likelihood phoneme strings, the common phoneme string extraction unit 25 extracts a common phoneme string from the two maximum-likelihood phoneme strings and saves the extracted common phoneme string in the storage unit 14. When acquiring another maximum-likelihood phoneme string, the common phoneme string extraction unit 25 further extracts a common phoneme string from the saved common phoneme string and the latest maximum-likelihood phoneme string and saves the newly extracted common phoneme string in the storage unit 14. In this way, every time another maximum-likelihood phoneme string is acquired, the common phoneme string extraction unit 25 updates the common phoneme string by extracting a common phoneme string between the another maximum-likelihood phoneme string and an already-extracted common phoneme string. Through the operation, the number of phonemes that are not included in the phoneme strings of the keywords registered in the keyword dictionary and are included in the common phoneme string decreases. Therefore, the matching unit 26 enables the accuracy at which a correct keyword that the user has intended is selected to increase.

In the variation, the common phoneme string extraction unit 25 may extract a common phoneme string by extracting phonemes each of which is common to a majority of maximum-likelihood phoneme strings among three or more maximum-likelihood phoneme strings and arranging the extracted phonemes in a sequence of utterances. In this case, the common phoneme string extraction unit 25 may include phonemes corresponding to a phrase that the user repeated relatively many times in a common phoneme string in addition to phonemes corresponding to a phrase that the user repeated every time the user uttered. For this reason, the possibility of being able to identify a keyword that the user intends without the user repeating a phrase that is similar to but different from the keyword each time is improved.

Moreover, according to still another variation, the matching unit 26 may identify a prescribed number of keywords in descending order of the degree of similarity, the prescribed number being two or more. The presentation unit 27 may display the prescribed number of keywords to the user. Performing the operation enables the possibility of a keyword that the user intends being included in the presented keywords to increase.

The voice recognition device according to the above-described embodiment and variations may be implemented in a client-server type system.

Figure 10:
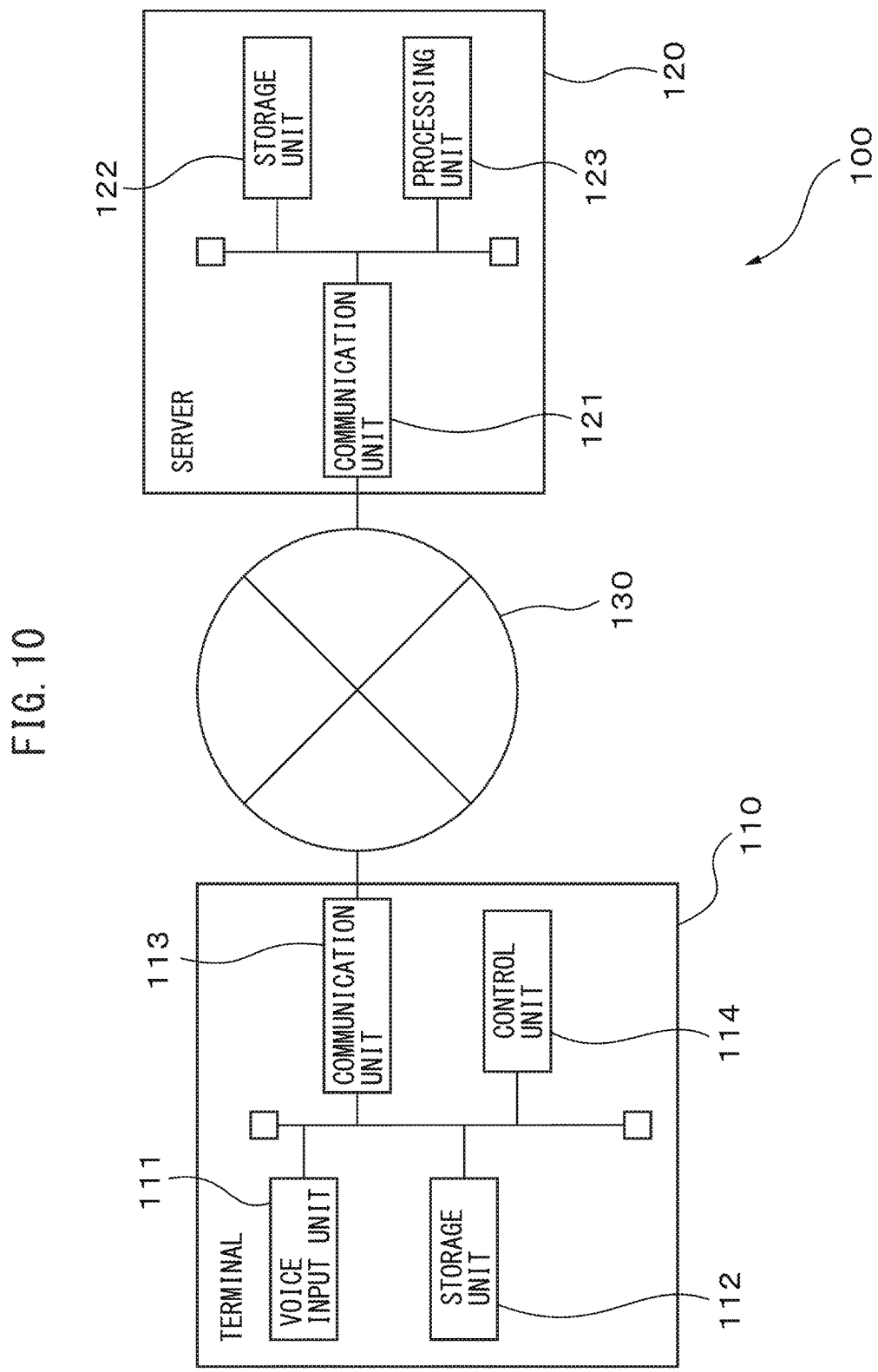
FIG. 10 is a schematic configuration diagram of a client-server system in which a voice recognition device according to the embodiment and variations thereof is implemented.

FIG. 10 is a schematic configuration diagram of a client-server system in which a voice recognition device according to any of the above-described embodiment and variations thereof is implemented.

A client-server system 100 includes a terminal 110 and a server 120, and the terminal 110 and the server 120 are configured to be communicative with each other via a communication network 130. The terminal 110 that the client-server system 100 includes may exist in plurality. Similarly, the server 120 that the client-server system 100 includes may exist in plurality.

The terminal 110 includes a voice input unit 111, a storage unit 112, a communication unit 113, and a control unit 114.

The voice input unit 111, the storage unit 112, and the communication unit 113 are, for example, connected to the control unit 114 via a bus.

The voice input unit 111 includes, for example, an audio interface and an A/D converter. The voice input unit 111 acquires, for example, a voice signal that is an analog signal from a microphone and digitizes the voice signal by sampling the voice signal at a prescribed sampling rate. The voice input unit 111 outputs the digitized voice signal to the control unit 114.

The storage unit 112 includes, for example, a nonvolatile semiconductor memory and a volatile semiconductor memory. The storage unit 112 stores a computer program for controlling the terminal 110, identification information of the terminal 110, various types of data and computer programs that are used in the voice recognition process, and the like.

The communication unit 113 includes an interface circuit for connecting the terminal 110 to the communication network 130. The communication unit 113 transmits feature vectors received from the control unit 114 to the server 120 via the communication network 130 in conjunction with the identification information of the terminal 110.

The control unit 114 includes one or a plurality of processors and a peripheral circuit thereof. The control unit 114 achieves the functions of the voice section detection unit 21, the feature extraction unit 22, and the presentation unit 27 among the respective functions of the processing units according to the respective above-described embodiment and variations. In other words, the control unit 114 detects a voice section from a voice signal and calculates a feature vector including a plurality of feature amounts that represent a feature of a human voice from each frame in the voice section. The control unit 114 transmits the feature vectors of the respective frames to the server 120 via the communication unit 113 and the communication network 130 in conjunction with the identification information of the terminal 110. The control unit 114 displays an identified keyword received from the server 120 on a display (not illustrated) or plays back a synthesized voice signal corresponding to the identified keyword via a speaker (not illustrated).

The server 120 includes a communication unit 121, a storage unit 122, and a processing unit 123. The communication unit 121 and the storage unit 122 are connected to the processing unit 123 via a bus.

The communication unit 121 includes an interface circuit for connecting the server 120 to the communication network 130. The communication unit 121 receives the feature vectors of the respective frames and the identification information of the terminal 110 from the terminal 110 via the communication network 130 and hands the received data to the processing unit 123.

The storage unit 122 includes, for example, a nonvolatile semiconductor memory and a volatile semiconductor memory. The storage unit 122 stores a computer program for controlling the server 120 and the like. The storage unit 122 may also store a computer program for executing the voice recognition process and feature vectors of respective frames received from respective terminals.

The processing unit 123 includes one or a plurality of processors and a peripheral circuit thereof. The processing unit 123 achieves the functions of the respective units other than the voice section detection unit 21, the feature extraction unit 22, and the presentation unit 27 among the respective functions of the processing units in the voice recognition device according to the respective above-described embodiment and variations. In other words, the processing unit 123 calculates a maximum-likelihood phoneme string using the feature vectors of the respective frames received from the terminal 110 and determines whether or not a keyword registered in the keyword dictionary may be detected on the basis of the maximum-likelihood phoneme string. When no keyword is detected from one voice signal, the processing unit 123 extracts a common phoneme string from maximum-likelihood phoneme strings calculated from the respective ones of a plurality of voice signals and identifies a keyword that has a phoneme string most resembling the common phoneme string. The processing unit 123 transmits information representing the identified keyword or a synthesized voice signal corresponding to the keyword to the terminal 110 via the communication unit 121 and the communication network 130.

The terminal 110 may transmit a voice signal itself to the server 120. In this case, the processing unit 123 of the server 120 achieves the functions of the processing units in the voice recognition device according to the respective above-described embodiment and variations other than the function of the presentation unit 27.

The computer program that makes a computer achieve the respective functions that the processing units in the voice recognition device according to the respective above-described embodiment and variations have may be provided in a form recorded in a computer-readable medium, such as a magnetic recording medium or an optical recording medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory computer-readable recording medium having recorded thereon a computer program for voice recognition that causes a computer to execute a process comprising:

extracting, from a first voice signal of a user, a first string of phonemes included in the first voice signal;

determining whether or not any keyword among a plurality of registered keywords stored in a memory is detected in the first string;

when any keyword is detected in the first string, outputting information representing the detected keyword;

when any keyword is not detected, storing the first string;

extracting, from a second voice signal of the user, a second string of phonemes included in the second voice signal;

determining whether or not any keyword among the plurality of registered keywords is detected in the second string;

storing the second string when any keyword is not detected in the second string;

extracting a string of common phonemes from the first string and the second string;

calculating, for each of the plurality of registered keywords, a first degree of similarity between a string of phonemes corresponding to the keyword and the string of common phonemes; and selecting, among the plurality of keywords, a prescribed number of keywords based on the first degree of similarity for each keyword, wherein determination of whether or not any keyword is detected in the first string includes:
calculating, for each of the plurality of registered keywords, a second degree of similarity between a string of phonemes corresponding to the keyword and the first string of phonemes based on a number of coincident phonemes between the first string of phonemes and the string of phonemes corresponding to the keyword, a number of phonemes that are included in the string of phonemes corresponding to the keyword but not included in the first string of phonemes, and a number of phonemes that are included in the string of phonemes corresponding to the keyword and are different from phonemes at corresponding positions in the first string of phonemes; and
determining that, when a maximum value among the second degrees of similarity is larger than a predetermined threshold value, the keyword corresponding to the maximum value is detected in the first string.

2. The non-transitory computer-readable recording medium having recorded thereon the computer program for voice recognition according to claim 1, wherein
selection of the predetermined number of keywords includes selecting the prescribed number of keywords among the plurality of keywords in descending order of the first degree of similarity for each keyword.

3. The non-transitory computer-readable recording medium having recorded thereon the computer program for voice recognition according to claim 1, wherein
extraction of the string of common phonemes includes extracting the string of common phonemes after deleting a phoneme representing silence from each of the first string and the second string.

4. The non-transitory computer-readable recording medium having recorded thereon the computer program for voice recognition according to claim 1, wherein
extraction of the string of common phonemes includes extracting the string of common phonemes after deleting a phoneme included in only one of the first string and the second string from each of the first string and the second string.

5. The non-transitory computer-readable recording medium having recorded thereon the computer program for voice recognition according to claim 1, wherein
extraction of the string of common phonemes includes extracting the string of common phonemes after substituting, for each of the first string and the second string, a phoneme that is included in the string and which belongs to a phoneme group whose phonemes can be substituted with one another with a representative phoneme associated with the phoneme group.

6. The non-transitory computer-readable recording medium having recorded thereon the computer program for voice recognition according to claim 1, the process further comprises
detecting a first voice section in which the user utters in the first voice signal and detecting a second voice section in which the user utters in the second voice signal,
wherein extraction of the first string includes extracting a string of phonemes included in the first voice section as the first string, and extraction of the second string includes extracting a string of phonemes included in the second voice section as the second string.

7. The non-transitory computer-readable recording medium having recorded thereon the computer program for voice recognition according to claim 1, wherein
calculation of the first degree of similarity includes calculating, for each of the plurality of keywords, an edit distance between a string of phonemes corresponding to the keyword and the string of common phonemes and, based on the edit distance, calculating the first degree of similarity.

8. The non-transitory computer-readable recording medium having recorded thereon the computer program for voice recognition according to claim 7, wherein
calculation of the first degree of similarity includes calculating, for each of the plurality of keywords, a minimum value of the edit distance using dynamic programming matching and, based on the minimum value, calculating the first degree of similarity.

9. The non-transitory computer-readable recording medium having recorded thereon the computer program for voice recognition according to claim 7, wherein
calculation of the first degree of similarity includes calculating, for each of the plurality of keywords, a minimum value of the edit distance using dynamic programming matching and, based on a degree of coincidence between a string of phonemes corresponding to the keyword when the edit distance takes the minimum value and the string of common phonemes, calculating the first degree of similarity.

10. The non-transitory computer-readable recording medium having recorded thereon the computer program for voice recognition according to claim 1, the process further comprises
extracting, from a third voice signal representing a voice of the user, a third string of phonemes included in the third voice signal,
wherein extraction of the string of common phoneme includes extracting a string of common phonemes to the first string, the second string, and the third string.

11. The non-transitory computer-readable recording medium having recorded thereon the computer program for voice recognition according to claim 1, the process further comprises
presenting the selected prescribed number of keywords to the user.

12. A voice recognition device comprising:
a memory configured to store a plurality of registered keywords; and
a processor configured to:
extract, from a first voice signal of a user, a first string of phonemes included in the first voice signal;
determine whether or not any keyword among a plurality of registered keywords is detected in the first string;
when any keyword is detected in the first string, output information representing the detected keyword;
when any keyword is not detected in the first string, store the first string;
extract, from a second voice signal of the user, a second string of phonemes included in the second voice signal;
determine whether or not any keyword among a plurality of registered keywords is detected in the second string;

store the second string when any keyword is not detected in the second string;

extract a string of common phonemes from the first string and the second string;

calculate, for each of the plurality of registered keywords, a first degree of similarity between a string of phonemes corresponding to the keyword and the string of common phonemes; and select, among the plurality of keywords, a prescribed number of keywords based on the first degree of similarity for each keyword, wherein the processor for the determination of whether or not any keyword is detected executes to:

calculate, for each of the plurality of registered keywords, a second degree of similarity between a string of phonemes corresponding to the keyword and the first string of phonemes based on a number of coincident phonemes between the first string of phonemes and the string of phonemes corresponding to the keyword, a number of phonemes that are included in the string of phonemes corresponding to the keyword but not included in the first string of phonemes, and a number of phonemes that are included in the string of phonemes corresponding to the keyword and are different from phonemes at corresponding positions in the first string of phonemes; and determine that, when a maximum value among the second degrees of similarity is larger than a predetermined threshold value, the keyword corresponding to the maximum value is detected in the first string.

13. The voice recognition device according to claim 12, wherein selection of the predetermined number of keywords includes selecting the prescribed number of keywords among the plurality of keywords in descending order of the first degree of similarity for each keyword.

14. The voice recognition device according to claim 12, wherein extraction of the string of common phonemes includes extracting the string of common phonemes after deleting a phoneme representing silence from each of the first string and the second string.

15. The voice recognition device according to claim 12, wherein extraction of the string of common phonemes includes extracting the string of common phonemes after deleting a phoneme included in only one of the first string and the second string from each of the first string and the second string.

16. The voice recognition device according to claim 12, wherein extraction of the string of common phonemes includes extracting the string of common phonemes after substituting, for each of the first string and the second string, a phoneme that is included in the string and which belongs to a phoneme group whose phonemes can be substituted with one another with a representative phoneme associated with the phoneme group.

17. The voice recognition device according to claim 12, wherein the processor is further configured to detect a first voice section in which the user utters in the first voice signal and detect a second voice section in which the user utters in the second voice signal, wherein extraction of the first string includes extracting a string of phonemes included in the first voice section as the first string, and extraction of the second string includes extracting a string of phonemes included in the second voice section as the second string.

18. The voice recognition device according to claim 12, wherein calculation of the first degree of similarity includes calculating, for each of the plurality of keywords, an edit distance between a string of phonemes corresponding to the keyword and the string of common phonemes and, based on the edit distance, calculating the first degree of similarity.

19. The voice recognition device according to claim 18, wherein calculation of the first degree of similarity includes calculating, for each of the plurality of keywords, a minimum value of the edit distance using dynamic programming matching and, based on the minimum value, calculating the first degree of similarity.

20. The voice recognition device according to claim 18, wherein calculation of the first degree of similarity includes calculating, for each of the plurality of keywords, a minimum value of the edit distance using dynamic programming matching and, based on a degree of coincidence between a string of phonemes corresponding to the keyword when the edit distance takes the minimum value and the string of common phonemes, calculating the first degree of similarity.

21. The voice recognition device according to claim 12, wherein the processor is further configured to extract, from a third voice signal representing a voice of the user, a third string of phonemes included in the third voice signal, wherein extraction of the string of common phoneme includes extracting a string of common phonemes to the first string, the second string, and the third string.

22. The voice recognition device according to claim 12, wherein the processor is further configured to present the selected prescribed number of keywords to the user.

23. A voice recognition method comprising:

extracting, from a first voice signal of a user, a first string of phonemes included in the first voice signal;

determining whether or not any keyword among a plurality of registered keywords stored in a memory is detected in the first string;

when any keyword is detected in the first string, outputting information representing the detected keyword;

when any keyword is not detected, storing the first string;

extracting, from a second voice signal of the user, a second string of phonemes included in the second voice signal;

determining whether or not any keyword among a plurality of registered keywords is detected in the second string;

storing the second string when any keyword is not detected in the second string;

extracting a string of common phonemes from the first string and the second string; and calculating, with respect to each of the plurality of registered keywords, a first degree of similarity between a string of phonemes corresponding to the keyword and the string of common phonemes and, among the plurality of keywords, selecting a prescribed number of keywords based on the first degree of similarity for each keyword, wherein determination of whether or not any keyword is detected in the first string includes:

calculating, for each of the plurality of registered keywords, a second degree of similarity between a string of phonemes corresponding to the keyword and the first string of phonemes based on a number of coincident phonemes between the first string of phonemes and the string of phonemes corresponding to the keyword, a number of phonemes that are included in the string of phonemes corresponding to the keyword but not included in the first string of phonemes, and a number of phonemes that are included in the string of phonemes corresponding to the keyword and are different from phonemes at corresponding positions in the first string of phonemes; and determining that, when a maximum value among the second degrees of similarity is larger than a predetermined threshold value, the keyword corresponding to the maximum value is detected in the first string.

\* \* \* \* \*